United States Patent
Manken et al.

(10) Patent No.: US 7,558,657 B2
(45) Date of Patent: Jul. 7, 2009

(54) METHOD FOR THE PREVENTION OF TURNOVER OF REAR WHEEL STEERED VEHICLES, IN PARTICULAR OF INDUSTRIAL TRUCKS

(75) Inventors: Frank Manken, Henstedt-Ulzburg (DE); Henrik Schroder, Winsen-Roydorf (DE); Daniel Wesemeier, Darmstadt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 526 days.

(21) Appl. No.: 11/235,744

(22) Filed: Sep. 27, 2005

(65) Prior Publication Data
US 2006/0065470 A1    Mar. 30, 2006

(30) Foreign Application Priority Data
Sep. 28, 2004   (DE) ............. 10 2004 046 890

(51) Int. Cl.
*B62D 6/00*   (2006.01)
*B62D 7/00*   (2006.01)

(52) U.S. Cl. ................. 701/41; 180/410
(58) Field of Classification Search ........... 701/41; 172/285, 278; 180/6.2, 6.24; 475/18; 477/1
See application file for complete search history.

(56) References Cited

U.S. PATENT DOCUMENTS

| | | | | | |
|---|---|---|---|---|---|
| 3,598,185 | A | * | 8/1971 | Richey | 172/242 |
| 4,955,630 | A | * | 9/1990 | Ogren | 280/419 |
| 5,730,453 | A | * | 3/1998 | Owsen | 280/282 |

FOREIGN PATENT DOCUMENTS

| | | |
|---|---|---|
| DE | 40 31 304 A1 | 4/1992 |
| DE | 195 15 053 A1 | 5/1996 |
| DE | 199 18 597 C2 | 3/2001 |
| DE | 100 08 984 A1 | 8/2001 |
| DE | 101 02 003 A1 | 7/2002 |
| DE | 10 04 658 A1 | 8/2004 |

* cited by examiner

*Primary Examiner*—Yonel Beaulieu
(74) *Attorney, Agent, or Firm*—Vidas, Arrett & Steinkraus, P.A.

(57) ABSTRACT

A method for the prevention of turnover of rear wheel steered vehicles includes providing a vehicle with a plurality of sensors, and providing slip angle restriction software adapted to receive as inputs the outputs of the plurality of sensors. The software calculates an estimated sideslip angle based on sensor outputs, calculates a slip angle on the rear wheels based on the estimated sideslip angle, calculates a maximum allowable slip angle, compares the slip angle and the maximum allowable slip angle, and determines a steering angle correction value if the actual slip angle is greater than the maximum allowable slip angle. Any steering angle correction value calculated is applied to the rear wheels of the vehicle.

11 Claims, 3 Drawing Sheets

METHOD FOR THE PREVENTION OF TURNOVER OF REAR WHEEL STEERED VEHICLES, IN PARTICULAR OF INDUSTRIAL TRUCKS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The sidewise turnover of vehicles when driving curves depends on the cornering force which is exerted by the wheels of the vehicle. Therefore, in order to prevent a sideways turnover, the cornering force has to be reduced in an appropriate manner. Known systems for increasing the turnover stability use the following effects for this purpose:

Reduction of the tyre cornering force by reducing the vehicle speed

Reduction of the tyre cornering force by blocking the wheel

Reduction of the tyre cornering force by intervention into the steering angle of the vehicle.

The present invention deals with a method for increasing the sideways turnover security when driving curves of rear wheel steered vehicles by an intervention into the steering angle.

From DE 100 08 984 A1 it has become known to make the steering movement of industrial trucks dependent from the mass and/or the lifting height of a load that is taken up by the industrial truck. In this it is dealt with a controlled method without making use of driving dynamic variables of the vehicle. Any intervention into the steering angle is not provided.

From DE 199 18 597 C2 it has become known to perform an automatic steering intervention after determination of a so-called turnover coefficient. However, a steering intervention according to this method makes sense only for vehicles with front wheel steering. The particular properties of rear wheel steered vehicles are not taken into account. Moreover, several additional sensors are necessary on the vehicle.

From DE 195 15 053 A1 it is known to detect slip angles for the front and rear wheels, and to construe a slip angle difference as a control variable. The slip angles on the front and rear wheels are detected through the sideslip angle and the yaw rate. With the aid of the known method, oversteering or understeering of the vehicle can be influenced. However, an enhancement of the dynamic turnover security of rear wheel steered vehicles is not possible with the known method.

The present invention is based on the objective to provide a method for the prevention of turnover of rear wheel steered vehicles, which takes sufficiently into account the driving dynamic behaviour of such a vehicle when driving in curves.

BRIEF SUMMARY OF THE INVENTION

In the method of the present invention, only the detected slip angles on the steered rear wheels of the vehicle are compared with a permitted maximum value, which still allows for sufficient turnover stability in the corresponding driving situation. When the maximum value is exceeded, the steering angle is corrected so far until the slip angle is below the maximum value. Thus, it is dealt with a controlling intervention, which permits driving through a curve at maximum speed wherein the turnover stability limit is constantly taken into account at the same time. In other words, the present invention restricts the slip angle of the steered rear wheels to predetermined values, depending on the situation. The steering angle which is predetermined by the driver is superimposed by an additional steering angle, which is compensated until the slip angle is below the permitted maximum value.

The advantage of the method of the present invention is that turnover is avoided, the means used being minimal in this. Preferably, the detection of the respective slip angle takes place by measuring the driving speed, the steering angle and the yaw rate. Usually, the vehicle speed and also the steering angle are measured anyway. In particular, measurement of the steering angle takes place when an electric or electro-hydraulic steering is provided. The yaw rate can be determined with the aid of a relatively simple sensor on the vehicle.

In realising the present invention, an estimation of the sideslip angle is performed from the measured drive dynamic variables in an observer software. Normally, when taken together with the yaw rate, the estimation is precise enough to determine the slip angle from it. For the estimation, further vehicle data are consulted, the position of the vehicle's centre of gravity in particular. In fact, the production of the software requires a certain operating expense at first; however, when used in an industrial truck, the hardware required in the vehicle in order to perform the method is minimal, because with respect to conventional vehicles, only a yaw sensor is necessary in addition. It is to be understood that the vehicle has to provide means to enable an intervention in the steering. However, this is normally the case, in particular in steer-by-wire steering or mechanical superimposition steering, which are usually provided.

Anyhow, it may occur that the estimated sideslip angle differs significantly from the actual one. Such a deviation can be detected by comparing the yaw rate resulting from the estimation of the sideslip angle with the actually measured yaw rate. When the variation between the yaw rates is too large, it may be provided not to perform a steering correction. Alternatively, it might be conceived to correct the estimated sideslip angle in a corresponding manner.

Instead of an estimation of the sideslip angle in the fashion described above, according to one form of realisation of the present invention it may be provided to metrologically retrieve the sideslip angle, preferably with the aid of optical sensors. Such sensors are per se known, but are relatively sumptuous at present, however.

In order to achieve the objective of turnover stability, it may be provided in another form of realisation of the present invention to additionally reduce the driving speed, when the actual slip angle is above the permitted value.

It is to be understood that the permitted maximum value for a slip angle does not only depend from the vehicle or its dimensions and its mass distribution, respectively, but also from the mass of the load which is picked up, as well as from the height thereof. As a consequence, the position of the vehicle's centre of gravity and/or the vehicle's mass are detected for the determination of the maximum permitted slip angle in one form of realisation of the present invention. According to a further form of realisation of the present invention, the vertical forces of the tyres or the bump travel of the tyres or that of the wheel suspension can be measured in order to determine the vehicle's mass and the position of the centre of gravity. The height of the load can also be measured in a simple way.

At low driving speeds, the slip angle restriction according to the invention may be switched off, in particular when the detection of the slip angle with the aid of an observer software becomes imprecise with decreasing driving speed.

Industrial trucks are mostly capable to drive at equal speed in the rearward direction as in the forward direction. According to the invention, slip angle restriction in the claimed manner can be performed even at rearward driving of such a vehicle. The turnover stability of a vehicle may also be endangered by rolling movements at forward driving. However, this invention is related to the control of turnover stability in curve driving. In curve driving, the dynamic driving behaviour of a vehicle when turning in into a curve is different from that when turning out. At turning in of a rear wheel steered vehicle into a curve, a slip angle opposite to the stationary value occurs at first. As a consequence, one form of realisation of the present invention provides that the steering angle when turning in into a curve is controlled such that the slip angle which is to be expected in the actual driving condition (speed, mass, position of the centre of gravity, steering angle) is not greater than a permitted maximum value and that the steering angle is restricted in a controlled way when turning out from a curve. A control when turning in into a curve would become unstable because of the slip angle with negative algebraic sign. Preferably, the slip angle when turning in into a curve is restricted to a smaller value than that when turning out. If this would not be the case, a vehicle would turn in into a curve with constant speed, in fact, and it would be apt to be stabilised on a stationary curve radius by the steering intervention of the present invention. However, it would not be possible to steer the vehicle into the straight-line driving again, because in rear wheel steered vehicles, a cornering force in the same direction as the centripetal force on the steered wheels is necessary in order to cut back the yaw movement. This additional cornering force can be realised only by an increase of the value of the slip angle. In order to be able to steer the vehicle straight-line again in such a case, the permitted slip angle on the rear wheels has to be greater in its value when turning out than the permitted slip angle when turning in into the curve. Of course, the permitted maximum value when turning out from the curve must fall below a value which might endanger the turnover stability.

Because a slip angle opposite to the stationary value occurs at the rear wheels at first upon turning in of a rear wheel steered vehicle into a curve, it is advantageous not to restrict the slip angle to a maximum value by control methods, such as the method of the present invention otherwise provides, because the overall system may become unstable. Instead, according to mentioned form of realisation, a steering intervention is performed such that the stationary slip angle which is to be expected in the actual driving condition by reason of a mathematical vehicle model does not become greater than a predetermined smaller maximum value. Thus, according to this method a controlled steering intervention takes place when turning in into a curve.

With the method of the invention, not only turnover avoidance takes place but it has also the advantage that the tyre wear resulting from sharp steering operations is diminished. In particular, this is the case with vehicles having a very direct steering (Joystick Steering).

BRIEF DESCRIPTION OF THE SEVERAL VIEWS OF THE DRAWINGS

The invention will hereinafter be explained in more detail by means of drawings.

DETAILED DESCRIPTION OF THE INVENTION

Figure 3:
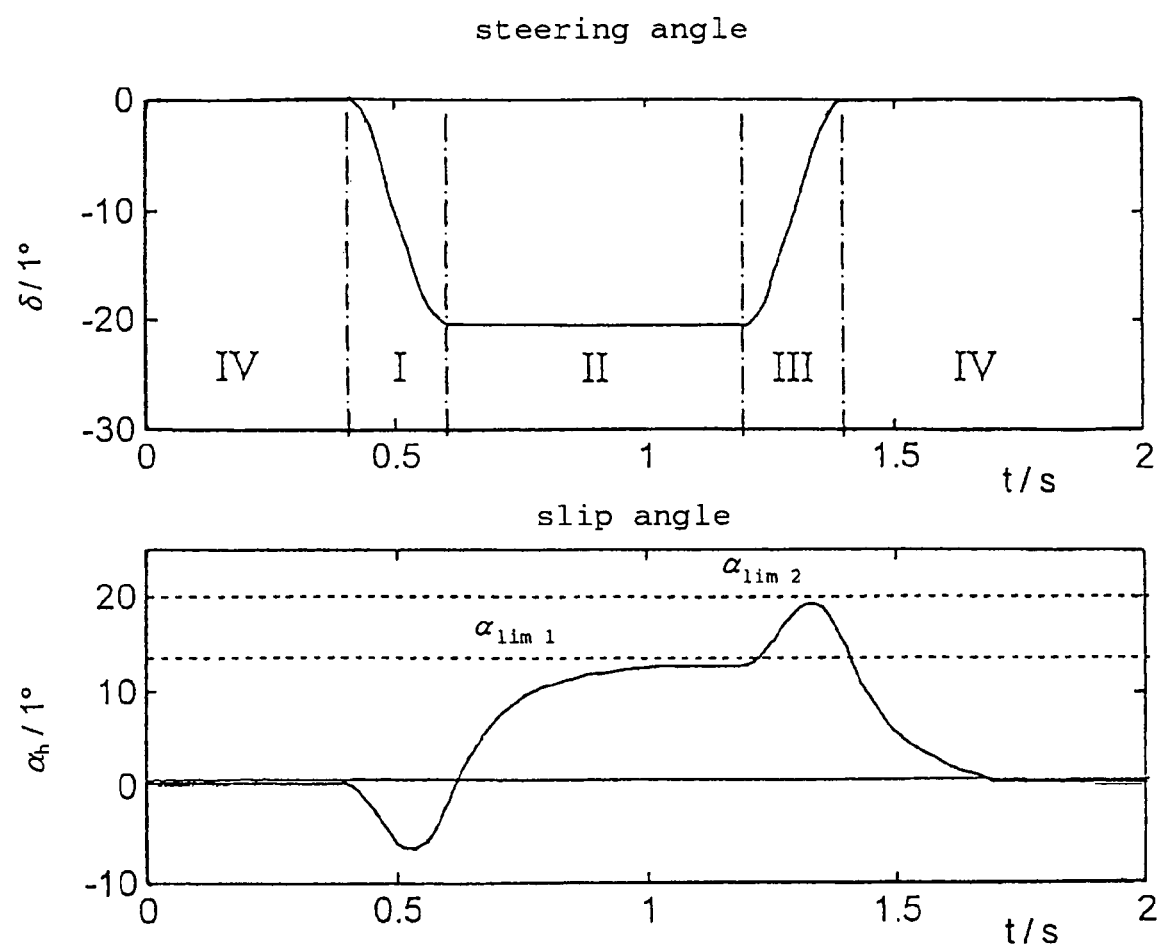
FIG. 3 shows two diagrams for steering angle and slip angle in a curve driving.

While this invention may be embodied in many different forms, there are described in detail herein a specific preferred embodiment of the invention. This description is an exemplification of the principles of the invention and is not intended to limit the invention to the particular embodiment illustrated The upper diagram of FIG. 3 shows a rear wheel steered industrial truck at straight-line driving and at driving through a curve with a predetermined steering angle. The sectors IV represent the straight-line driving and sector II the stationary curve driving. Sector I denotes the turning in into the curve and sector III the turning out from the curve. From the lower diagram in FIG. 3, one recognises that the slip angle during straight-line driving is zero, of course. During the stationary curve driving it approaches a limit value $\alpha_{lim1}$. During the transition from straight-line driving to stationary curve driving, a negative slip angle occurs for a short time, and when driving out from the sector II a greater slip angle $\alpha_{lim2}$ occurs.

Figure 1:
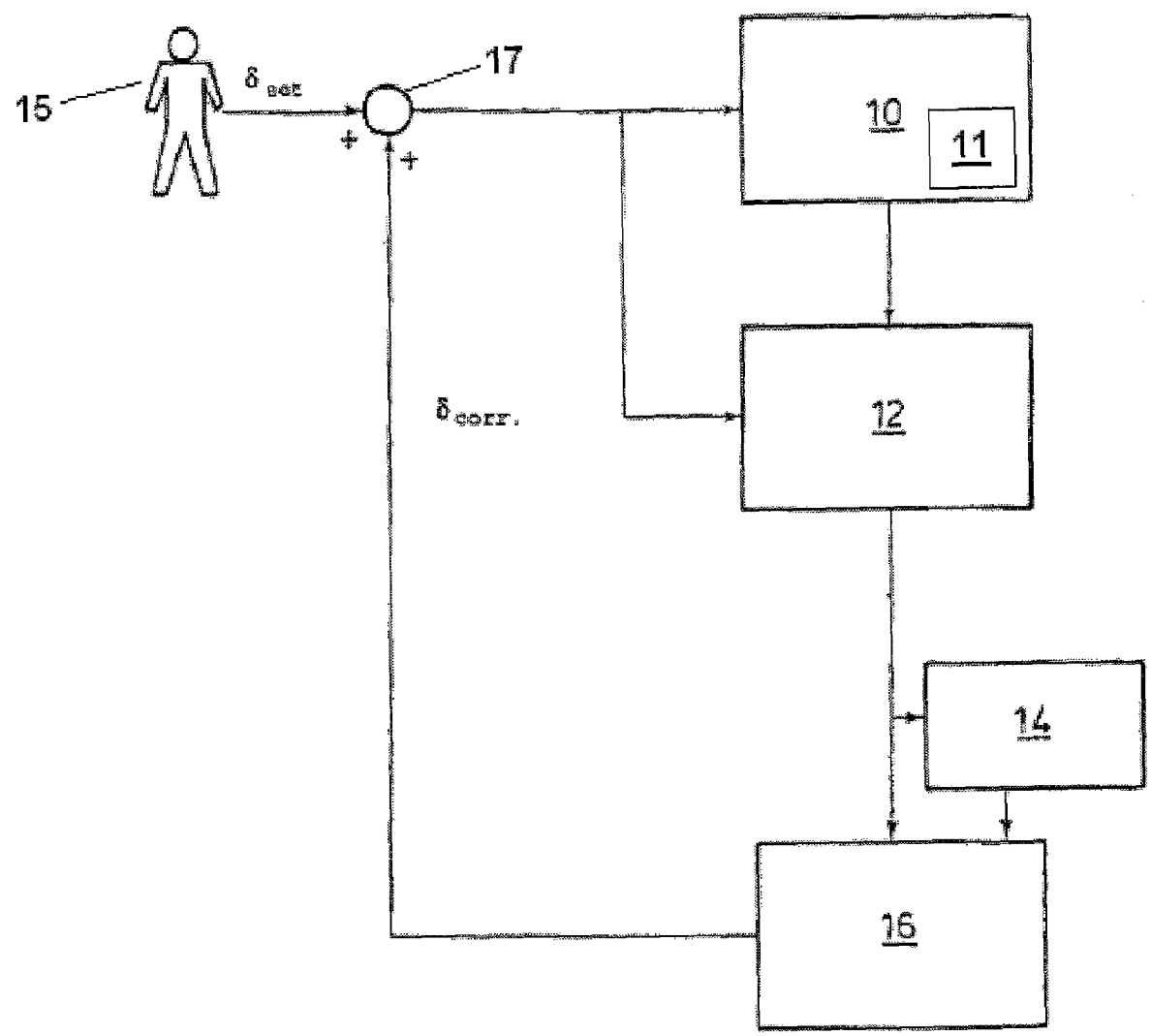
FIG. 1 shows in a very schematic manner a control scheme for the method of the invention.

In FIG. 1, a rear wheel steered industrial truck is denoted by 10. It has usual sensors 11 for the steering angle and the driving speed. The steering is electric or electro-hydraulical. In addition, the vehicle sensors 11 include a yaw sensor, with the aid of which the yaw rate can be detected. The vehicle dynamic variables are read into a so-called observer software 12. This determines the sideslip angle from the mentioned driving dynamic variables. This takes place by calculating a mathematical model of the vehicle in the observer software, from which the sideslip angle results with certain uncertainties. Precise calculation is not possible; the sideslip angle can be exactly detected metrologically at best. With the aid of the estimated sideslip angle, the slip angle on the rear wheels can be calculated in block 14. In the block 16, the comparison between the calculated slip angle and a situation-determined maximum value for the slip angle or the permitted maximum value takes place. This maximum value depends on the driving condition, which comprises at least the following variables: direction of the steering actuation (turning in or turning back), the driving direction, the driving speed and optionally also other driving condition variables, such as steering angle, lifting height or mass of the transported load. The driving condition variables are measured in the vehicle 10 and reach the block 16 either immediately or by calculation, in order to determine the driving-condition dependent maximum value for the slip angle. When the measured slip angle exceeds the respective predetermined maximum value, correction of the steering angle via the path $\delta_{corr}$ takes place. From the driver 15, a steering angle $\delta_{set}$ is given, which is immediately transmitted to the rear wheels of the vehicle, if it is not corrected. When correction of the inputted desired value 6set takes place, however, the desired value $\delta_{set}$ is corrected by the value of $\delta_{corr}$ at summing block 17 in order to remain below the respective maximum value for the slip angle. Such a regulation takes place continuously, until falling below the maximum value. It is desirable to approach the maximum value in a fashion according to control engineering. A too small slip angle in the curve driving of a vehicle does not frilly utilize the technical possibilities and abates the economic utilisation.

Figure 2:
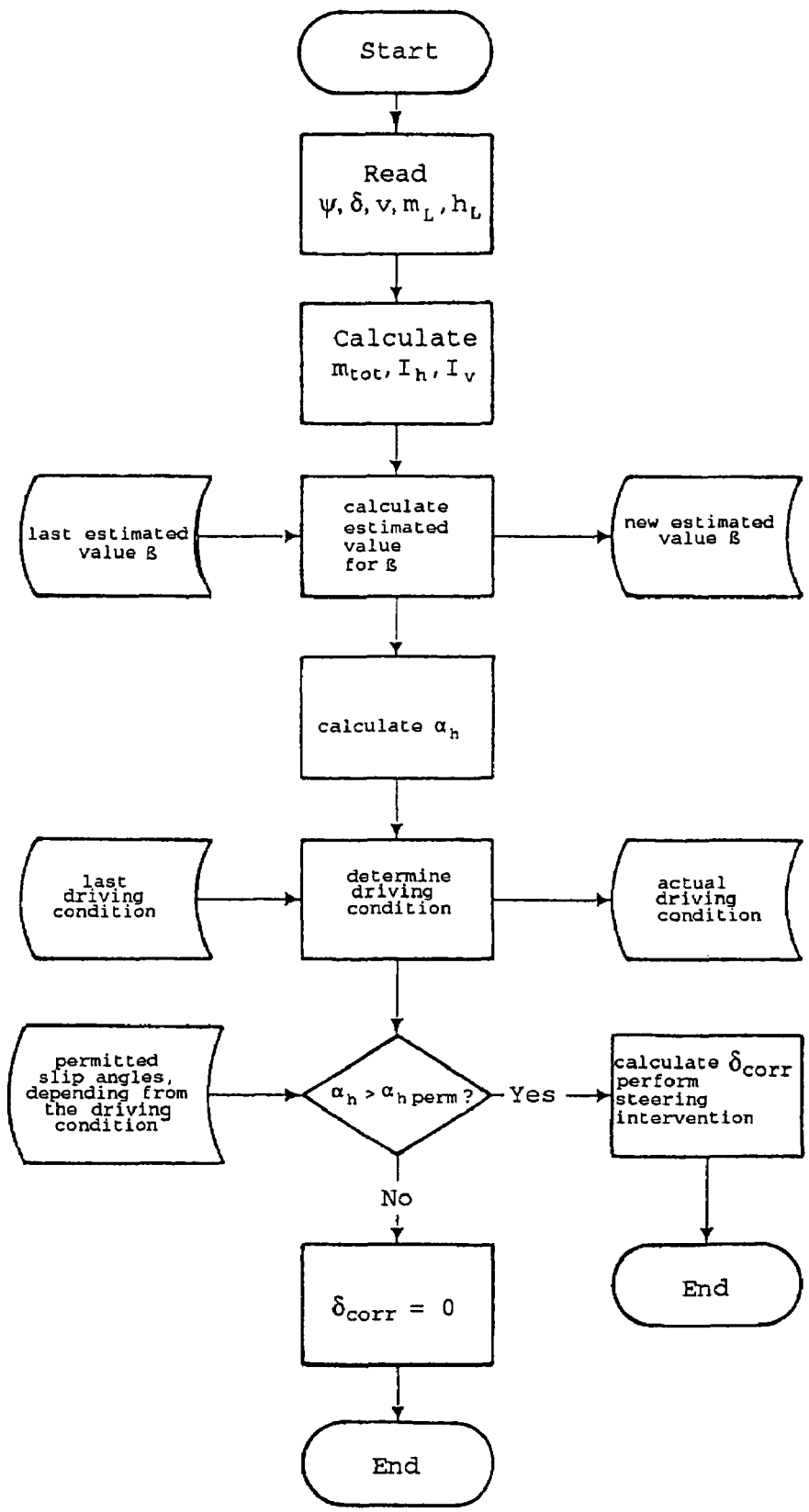
FIG. 2 shows a plan of the course of execution of a program for the method of the invention.

In FIG. 2 the course of execution of the program is represented, the following variables being read into the software after the start:

$\alpha_h$: slip angle on the rear axis
$\beta$: sideslip angle
$\delta$: steering angle
$\delta_{corr}$: additional steering angle for turnover avoidance
$\psi$: yaw rate
$h_L$: lift height of the picked up load.

Additionally, the overall mass of the vehicle with load as well as the distances of the vehicle centre of gravity to the rear axis in the vehicle longitudinal axis and of the vehicle centre of gravity to the front axis in the vehicle longitudinal axis take part in the program. In the already described manner, an estimated value for the sideslip angle $\beta$ is calculated and optionally compared with the last estimated value $\beta$. The new estimated value is stored. As the case may be, correction of the estimated value takes place with the aid of the comparison of the actually measured yaw rate with the calculated one $\psi$. With the aid of the sideslip angle $\beta$, the slip angle of the rear wheels $\alpha_h$ is calculated. For the rest, the driving condition is determined, which includes a series of different variables, as already mentioned, namely the direction of the steering actuation, driving direction, driving speed and driving condition variables such as steering angle, lifting height and mass of the transported load. From this, the permitted slip angle at the rear wheels results, which depends on the driving conditions. When the calculated slip angle is greater than the permitted maximum value, a steering intervention takes place with $\delta_{corr}$. When the measured slip angle is smaller than the permitted maximum value, no correction takes place, of course.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for the prevention of turnover of rear wheel steered vehicles, the method comprising:

providing a vehicle with a plurality of sensors, the plurality of sensors comprising a steering angle sensor, driving speed sensor, a yawing rate sensor, wherein each of the plurality of sensors has at least one output;

providing slip angle restriction software in the vehicle, the software adapted to receive as inputs the outputs of the plurality of sensors, the software adapted for calculating an estimated sideslip angle based on the outputs of the plurality of sensors;

calculating a slip angle on the rear wheels based on the estimated sideslip angle;

calculating a maximum allowable slip angle;

comparing the slip angle and the maximum allowable slip angle; and determining a steering angle correction value if the actual slip angle is greater than the maximum allowable slip angle; and applying the steering angle correction value to the rear wheels of the vehicle if the actual slip angle is greater than the maximum allowable slip angle.

2. The method of claim 1, further comprising:
determining the combined mass of the vehicle and a load;
determining a center of gravity for the vehicle and the load; and
inputting the combined mass of the vehicle and the load and the center of gravity for the vehicle and the load into the software for use in calculating the sideslip angle.

3. The method of claim 2, wherein the vehicle has a plurality of tires, and wherein the steps of determining the combined mass of the vehicle and a load and determining a center of gravity for the vehicle and the load comprise measuring the vertical forces on the tires.

4. The method of claim 2, wherein the vehicle has a plurality of tires, and wherein the steps of determining the combined mass of the vehicle and a load and determining a center of gravity for the vehicle and the load comprise measuring the bump travel of the tires.

5. The method of claim 2, wherein the vehicle has wheel suspensions, and wherein the steps of determining the combined mass of the vehicle and a load and determining a center of gravity for the vehicle and the load comprise measuring the travel of the wheel suspension.

6. The method of claim 1, further comprising:
omitting restriction of the slip angle if the driving speed is below a predetermined speed.

7. The method of claim 1, wherein the step of calculating an estimated sideslip angle further comprises storing the estimated sideslip angle.

8. The method of claim 4, wherein the step of calculating an estimated sideslip angle further comprises comparing the estimated sideslip angle against a previously stored sideslip angle and storing a new estimated sideslip angle.

9. The method of claim 1, further comprising:
reducing the driving speed if the actual slip angle is greater than the maximum allowable slip angle.

10. The method of claim 1, wherein the step of calculating a maximum allowable slip angle further comprises calculating a first maximum allowable slip angle and a second maximum allowable slip angle, the first maximum allowable slip angle being used in the step of comparing the slip angle and the maximum allowable slip angle if the vehicle is turning in into a curve or if the curve is a stationary curve, and the second maximum allowable being used in the step of comparing the slip angle and the maximum allowable slip angle if the vehicle is turning out from a curve.

11. A method for the prevention of turnover of rear wheel steered vehicles, the method comprising:

providing a vehicle with a plurality of sensors, the plurality of sensors comprising a steering angle sensor, driving speed sensor, a yawing rate sensor, wherein each of the plurality of sensors has at least one output;

providing slip angle restriction software in the vehicle, the software adapted to receive as inputs the outputs of the plurality of sensors, the software adapted for determining a sideslip angle with an optical sensor;

calculating an slip angle on the rear wheels based on the sideslip angle;

calculating a maximum allowable slip angle;

comparing the slip angle and the maximum allowable slip angle; and determining a steering angle correction value if the actual slip angle is greater than the maximum allowable slip angle; and applying the steering angle correction value to the rear wheels of the vehicle if the actual slip angle is greater than the maximum allowable slip angle.

* * * * *